United States Patent
Jones

(10) Patent No.: US 6,357,067 B1
(45) Date of Patent: Mar. 19, 2002

(54) MULTIPURPOSE SNOW/ICE TOOL FOR BACKCOUNTRY TRAVEL

(76) Inventor: Nathanael Whalen Jones, 48400 Kay's Rd., Apt. X, Davis, CA (US) 95666

( * ) Notice: Subject to any disclaimer, the term of this patent is extended or adjusted under 35 U.S.C. 154(b) by 0 days.

(21) Appl. No.: 09/796,773

(22) Filed: Feb. 28, 2001

(51) Int. Cl.⁷ .................................................. B25F 1/00
(52) U.S. Cl. ............................................. 7/116; 7/158
(58) Field of Search ............................ 7/116, 122, 145, 7/148, 158, 159

(56) References Cited

U.S. PATENT DOCUMENTS

| | | | |
|---|---|---|---|
| 3,404,412 A | * 10/1968 | Ryan | 7/116 |
| 3,473,712 A | * 10/1969 | Genchi | 7/116 X |
| 4,432,404 A | * 2/1984 | Clark et al. | 30/308.3 |
| 5,297,306 A | * 3/1994 | Shandel | 7/145 X |
| 5,345,635 A | * 9/1994 | Morgan | 7/116 |
| 5,507,051 A | * 4/1996 | Mazon | 7/116 |

* cited by examiner

Primary Examiner—D. S. Meislin
(74) Attorney, Agent, or Firm—Richard T. Holzmann

(57) ABSTRACT

A multipurpose snow tool for backcountry travel being a modified ice ax having a toothed pick at one end, an adze at the other and a shank therebetween having holes therein large enough to reduce weight without compromising structural integrity. The shank having shock absorbing upper spacers thereabout for insertion into the upper portion of a shaft of varying length depending upon user's physique. Lower spacers surround a combined reversible integrated spike saw held within said shaft, said spacers enclosing a pair of locking buttons supported by leaf springs to secure the spike saw in the lower shaft and to permit easy withdrawal therefrom and reversal for saw use. Furthermore, the invention includes a shovel blade having a sleeve like projection sized to snugly fit around the lower portion of said shaft which is always ready for use when attached while said spike is exposed. Thus, by depressing both buttons simultaneously, the spike saw is removed and reversed. When the spike is in the exposed position, the shovel blade can be quickly attached with a leashed bolt and wing nut.

7 Claims, 3 Drawing Sheets

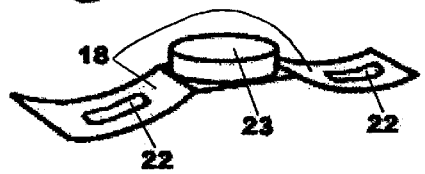
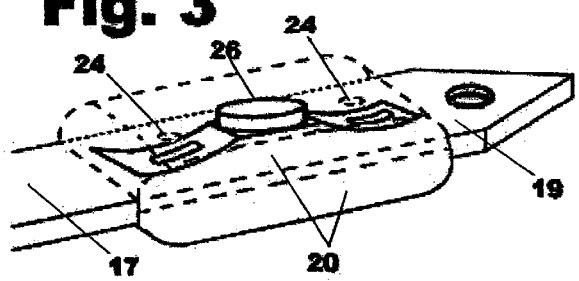
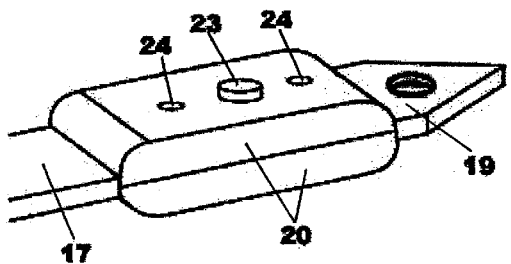
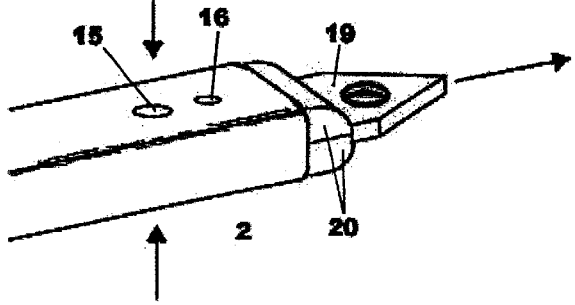
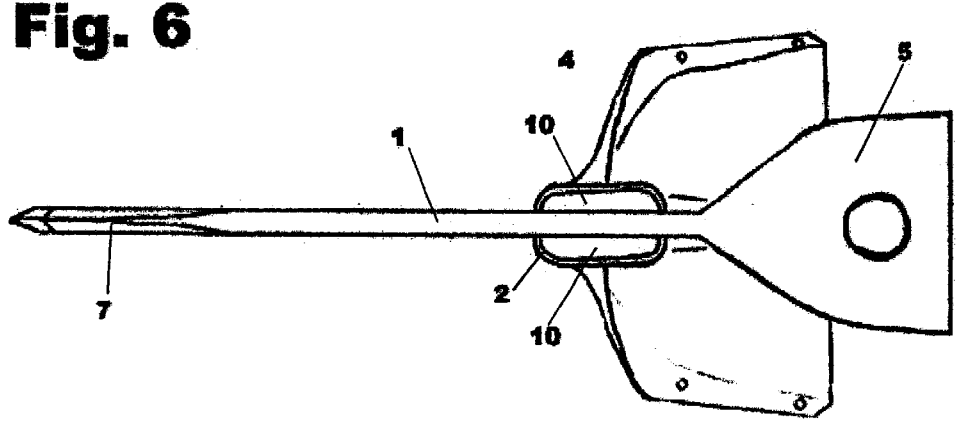

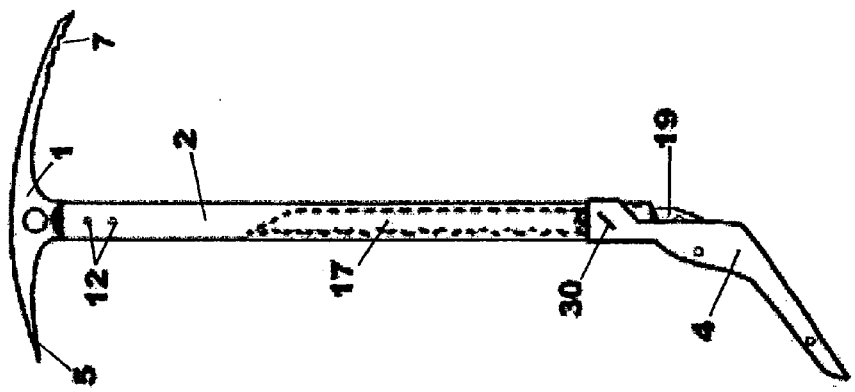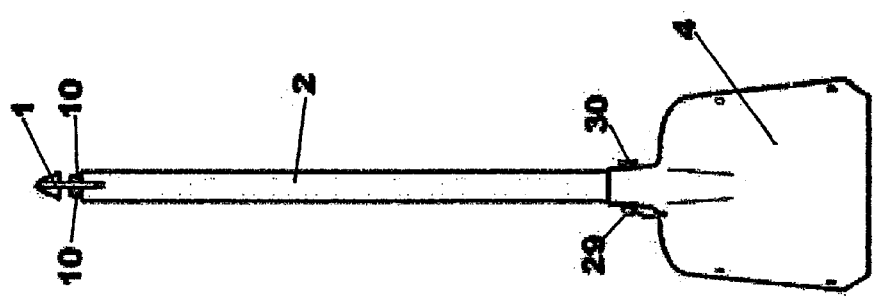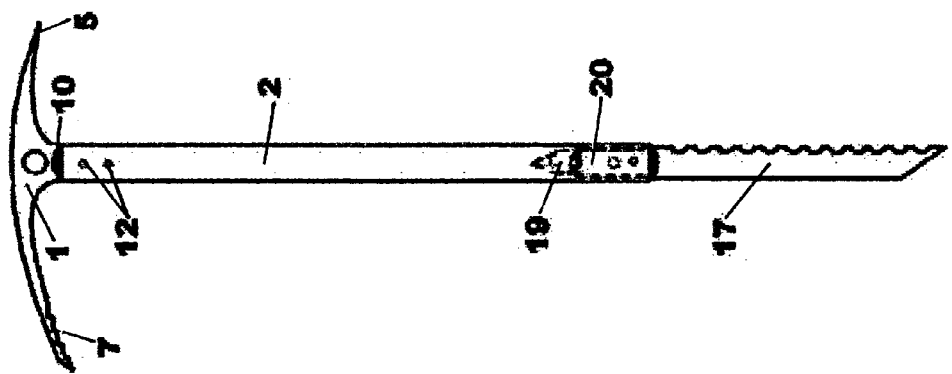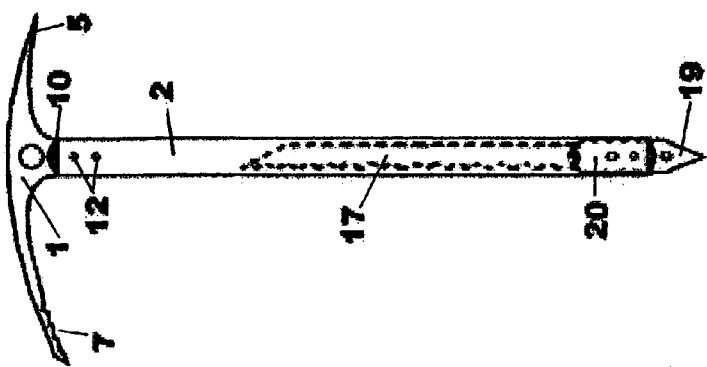

MULTIPURPOSE SNOW/ICE TOOL FOR BACKCOUNTRY TRAVEL

The priority of Provisional Patent Application No. 60/185,866 filed on Feb. 29, 2000 is claimed in this Utility Patent Application.

FIELD OF THE INVENTION

This invention is related in general to ice axes, and more particularly to an ax which incorporates several traditional snow tools in one.

BACKGROUND

Over the years there have been proposed a large number of survival tools for campers, hikers, military personnel and others who want a relatively compact and lightweight multifunctional implement for use under circumstances where there is not access to all of the different tools needed to perform various tasks. In general, the tool should be lightweight yet have high structural strength to withstand rugged use. Furthermore, the tool should be adaptable to such uses with a minimum amount of simple assembly or adjustment.

The ice ax is one of the most versatile and important pieces of mountaineering equipment. Without it, safe alpine travel is restricted to easy scrambles. An ice ax, and skill in its use, allows you to venture onto all forms of snow and ice, enjoying a greater variety of mountain landscapes during more seasons of the year.

The modern ice ax is an inherently simple tool with many uses. Below the snow line, it is used as a walking cane and to help brake going downhill. But its main role is in snow and ice travel, where it provides balance or a point of security to prevent a fall and serves as a means to stop a fall. The design is often a trade-off between features that make the tool better for specific purposes. A long ax may be suitable for cross-country travel and scrambling, where it is used as a cane and to provide security in low-angle climbing. However, a shorter ax is more useful for the steeper slopes encountered in alpine climbing. Weight is another consideration; some very light axes are not designed to withstand the demands of general mountaineering.

In the past, backcountry travelers have used many different tools including the ice axe, snow saw and snow shovel to aid them in their excursions. The ice axe, among other functions, serves as an anchor, a walking stick and a means for self-arrest. Modern ice axes are composed of three main parts: shaft, head and spike.

Usually, the shaft is a hollow oval tube about 2–4 feet in length, with a maximum width of 1.25 inches and is made of chromalloy steel or tempered aluminum. At the upper end of the shaft is the head made of ⅛ inch chromalloy steel having at its one end a pick about 5 inches long curving slightly downward with saw-like teeth on its underside. On the other end of the head is the adze which is formed as a flattened isoceles triangle about 1.5 inches on each side. The adze, is either welded at one end to the rest of the head or integrated into a single piece, and structured so its position is perpendicular to the shaft of the axe. Finally, one finds the spike, at the lower end of the shaft. It is ⅛ inch thick, a 1 inch wide flat piece of chromalloy steel or aluminum tapering to a point that protrudes 2 inches beyond the lower end of the shaft. It is held in the shaft by means of a hard rubber bushing and fixed expansion pins.

Mountaineers are extremely conscious of the weight and bulk of gear that they carry because it represents added effort and encumbrance in climbing. Therefore, the need to carry an extra shafted tool such as a shovel must be weighed against its encumbrance. There may be no way to rescue an avalanche victim or dig an emergency snow shelter (snow cave) without a shovel. This invention provides a small lightweight solution to this problem.

The snow shovel is a fundamental piece of equipment for the winter montaineer, and every member of a winter party should carry one. The shovel is used to excavate climbers from avalanche debris, dig emergency shelters, prepare tent platforms, and clear climbing routes. In choosing a shovel, a climber is torn between the heavy, bulky grain scoop, ideal for moving large amounts of loose snow quickly but less useful for avalanche debris or snow caves, and the compact folding or sectional shovel, convenient to carry and therefore less likely to be left at home. A snow shovel has also become an essential tool for backcountry travel. It is used for excavating an avalanche victim, building a snow shelter, digging a snow pit, and as a deadman anchor. The shovel blade is roughly one foot square, made of either tempered aluminum or plastic. The shaft is usually a 1 inch hollow circular aluminum tube, sometimes collapsible, with a D- or T-shaped plastic handle. This shovel is small enough to carry full time and to use inside a snow cave. It is strong, can hold a significant amount of snow, and is stable to grip and use.

Another tool that is less frequently carried in the backcountry, but just as important as any other, is the snow saw. It is used to perform a Rutschblock test (a snowpack stability test), and is an effective tool for cutting snow blocks for a shelter. A typical snow saw made of ⅛ inch tempered aluminum, would be 1–2 inches wide and 18–24 inches long with an L-shaped handle. The problem with most snow saws is that the depth of the cut is limited to the length of the blade. This is especially true in hard packed snow or ice.

Mountaineers trying to move safely through avalanche country need information on the ability of the snow to bond and sensitivity of the snowpack to forces that might cause it to avalanche. One can test for snow stability by using the Rutschblock test, for example, described below and of special relevance for the subject invention. This test is considered a particularly good indicator of the likelihood that a slope will slide. The test puts stress by a person on skis or on a snowboard on the top of a block or column of snow, whose width is about the length of a ski or snowboard, that has been excavated on three sides of a rectangular snow block. Clean vertical sides of the snow block should be made to a depth of about three feet which is readily achieved with the device of this invention, but achieved with great difficulty when a conventional short handled ice saw is used. The back wall of the block is cut free of the slope. A person on skis or snowboard steps onto the center of the block from the slope above. If the block supports the skier, that person then stresses the block with a series of jumps, leaping up with both skis. The amount of stress required to cause the block to fail at a weak layer is an indication of the relative stability of the slope. The device of this invention has been tested in this manner and shown to be able to cut the snow and/or ice to a much greater depth, and with greater ease, due to the length of the handle than can be done with a conventional ice saw.

Of course, the need for the reduction of weight in survival tools has been addressed by others as has the need to integrate one or another tool with the basic ice ax. In the prior art one finds several relevant inventions worthy of mention. Morgan in U.S. Pat. No. 5,345,635 (1994) discloses an ice ax shovel attachment thereby avoiding the need to carry an extra shafted tool which must be weighed against its encumbrance. However, there is a small problem in that the means for attachment are somewhat complicated. In an environment where a shovel is needed, any simplication of attachment is indeed a significant improvement. Patents have also been granted for modifications of ice ax heads: in 1998 to Brainerd U.S. Pat. No. 5,768,727, and in 1999 to Brainerd et al in U.S. Pat. No. 5,937,466. Smith in U.S. Pat. No. 4,727,609 (1988) discloses a multi-functional survival tool embodying a shaft, a tool head having a shovel blade portion which in turn consists of ax blade and hammer portions. In addition, the hollow shaft has slots therein for receiving a hunter's bow and a removable knife blade. This is not for use in a mountaineering environment. Shandel in U.S. Pat. No. 5,297,306 (1994) discloses a multipurpose outdoor tool being an ax having an elongated socket along the top of the ax blade for insertion of a tang of a detachable implement such as a spade blade, a pick point, a saw blade, a grub hoe blade, a combination hoe and rake blade, or any of various other implements.

Thus, it is an object of the subject invention to optimize the utility of the well tried ice ax with its pick and adze by minimization of weight and maximization of its utility in an ice and snow survival mode.

It is another objective to embody therein an ice saw using the shaft (handle) of the ice ax to contain an ice saw providing the ability to cut into ice and snow more deeply by using the length of the shaft of a conventional ice ax as a far longer handle than the normal short handle of the conventional ice saw.

It is a further objective to integrate the spike of the ice ax with the ice saw so that it becomes a reversible tool with either the spike or the saw exposed as needed.

It is yet another object to provide holes therein the body of the ice ax head and even the adze while maintaining their necessary strength in order to reduce overall weight.

It is also an object to provide shock absorbing upper spacers at the top of the shaft to be fixed to the shank of the ice ax head.

It is another object to provide lower spacers to the bottom of the ice ax shaft to secure a means for removing and replacing the combination spike and ice saw from the shaft.

It is an object to do the above with a minimum amount of simple assembly or adjustment.

It is a further object to do this in a tool at a low cost of fabricating the individual components and of assembling them into the completed tool.

SUMMARY OF THE INVENTION

A multipurpose ice ax for backcountry travel comprising: a head having a pick at its first end and an adze at its second end; a hollow shaft having holes therein its upper end to internally receive a shank of the head said shank having matching holes therein, said shaft having holes therein its lower end for receiving a combined reversible spike saw having matching holes therein; upper spacers connecting said shank of the head within said upper shaft for reducing the shock of said shank against said shaft when the force of the head impacts snow and ice; lower spacers having holes therein for connecting and rigidly fixing said spike saw within said lower shaft; means for reversing said spike saw to expose said spike or said saw as necessary; and a shovel blade having a blade portion and a pipe like portion having holes therein carried separately from the integrated multi-purpose ice ax and attachable to said lower shaft by means of a shovel fastener inserted through matching holes of said shaft and said pipe like portion while said spike saw is attached to said shaft.

BRIEF DESCRIPTION OF THE DRAWINGS

For a fuller understanding of the nature and objects of the invention, reference should be had to the following detailed description taken in connection with the accompanying drawings forming a part of this specification and in which similar numerals of reference indicate corresponding parts in all figures of the drawings:

FIG. 2 is a perspective view of the locking button/leaf springs unit;

FIG. 3 is a perspective view of FIG. 2 positioned above the saw blade and adjoining the spike;

FIG. 4 is a perspective view of FIG. 3 enclosed within the spacers;

FIG. 5 is a perspective view of FIG. 4 inserted within the lower end of the shaft;

FIG. 6 is a top view of the ice ax head looking down on the adze and pick and showing the upper rubber spacers and the shovel blade fixed to the shaft;

FIG. 7 is a side view of the ice ax with the spike exposed and the ice saw hidden within the shaft;

FIG. 8 is a side view of FIG. 7 showing the ice saw extended in position for use;

FIG. 9 is an end view of the ice ax head affixed to the upper end of the shaft having a front view of the shovel blade as affixed to the lower end of the shaft; and FIG. 10 is a side view of FIG. 9 showing a front view of the ice ax head with a side view of the shovel blade and illustrating the hidden ice saw in the shaft.

DESCRIPTION OF THE PREFERRED EMBODIMENTS

Figure 1:
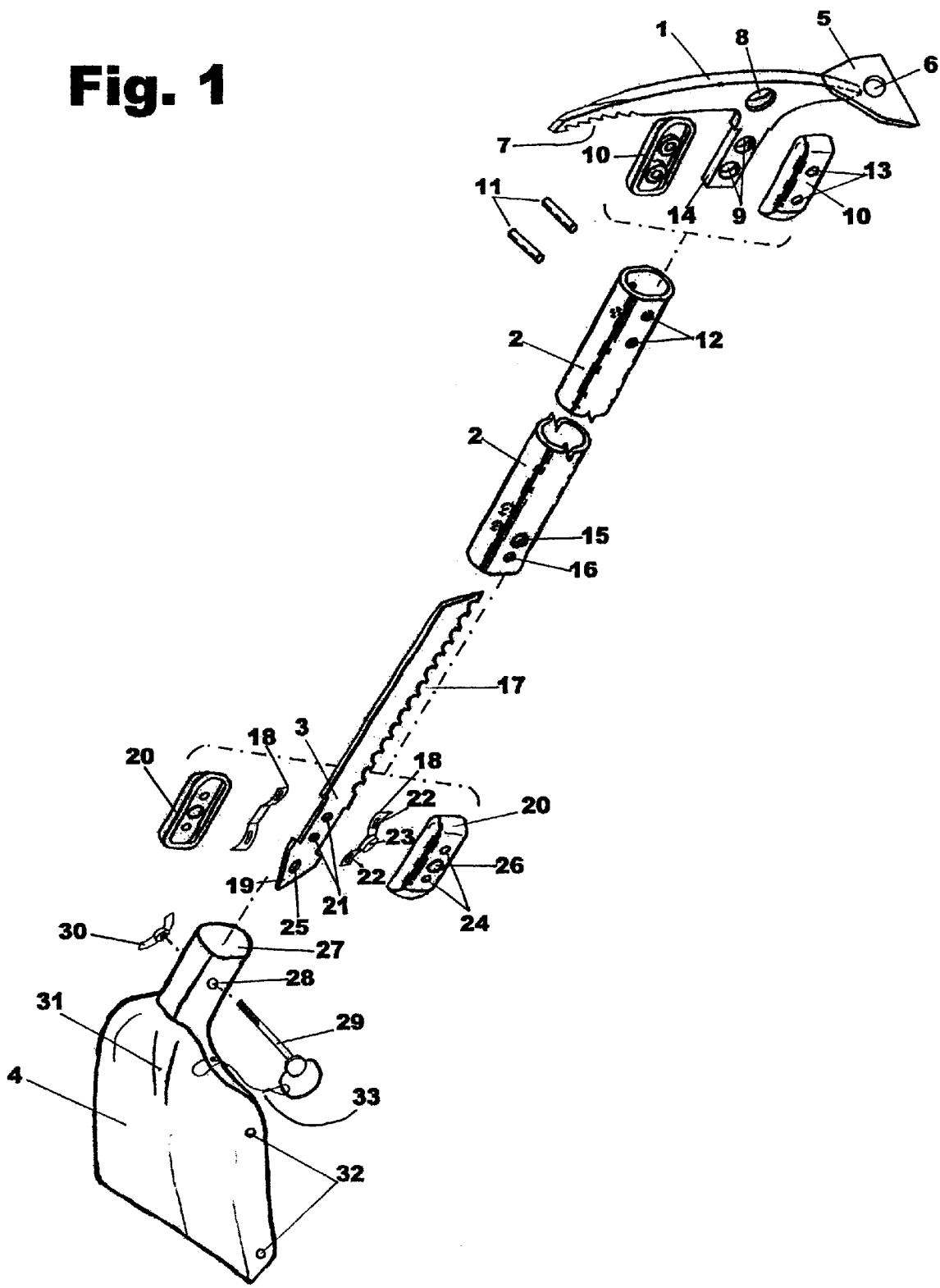
FIG. 1 is an exploded view of the tool of the invention illustrating each of the elements employed with the apertures therein for fastening it together.

This invention is designed more for the general mountaineer and/or snowboarder, cross-country skier, alpine skier, snowshoer and snowmobilier than for the expert. Its advantages over several individual tools are: (1) less overall weight, and (2) a compactness providing much easier use with a smaller backpack. Furthermore, the size and versatility of the tool ensures that not only is key gear not left at home, but the safety of the backcountry traveler is thereby significantly enhanced.

The defining attributes of the ice ax, snow shovel and snow saw are what makes this invention. The normal weight of these individual tools has been reduced and necessary tool components modified and combined to produce a compact, lightweight, multifunctional tool. In addition, this tool is adaptable to such uses with a minimum amount of simple assembly or adjustment.

The tool has three principal portions: the ice ax, the spike-saw piece and the shovel blade connected to a shaft which are used in various combinations to make different tools. These are illustrated in the exploded perspective view of FIG. 1 wherein ice ax head 1 is affixed to the upper end of shaft 2 while spike/saw piece 3 is attached to the lower end of shaft 2. Shaft 2 is typically of steel or aluminum, a non-stick coating of paint is also desirable, with a length varying with the height of the user. Shovel blade 4 is also attached to the lower end of shaft 2 and is made of iron, steel or aluminum, or even of impact resistant plastic such as polypropylene or graphite impregnated plastic. However, plastic may not be strong enough when encountering hard packed snow or ice.

The Ice ax portion has a permanently fixed head with pick and adze as in conventional ice axes. The difference between the traditional ice ax and this invention is that the spike on the bottom of the shaft can be removed thereby revealing a snow saw blade which is integrated with the spike and which is normally concealed in the shaft of the ice ax. When the spike-saw piece is removed and the spike end is inserted into the shaft, the ice ax is transformed into a snow saw, FIG. 8, with a cutting depth far beyond that of most snow saws. By merely reversing the spike-saw 3, the user instantly turns the ice ax into a snow saw with a 2–4 foot extension depending on the length of the ax. This then overcomes a major problem of most snow saws in that the depth of the cut is no longer limited to the mere length of the saw blade.

Head 1 is normally made of iron, steel or aluminum although chromalloy steel is preferred since it is relatively lightweight, has a high tensile strength and is resistant to fractures in cold weather. It may be desirable to have a protective coating of paint thereon. Also, exchanging the general mountaineering ice ax head for one more suitable for technical climbing, such as disclosed in U.S. Pat. No. 5,937,466, is possible. A pick 7 is positioned on head 1 opposite adze 5. The pick 7 is downward sloping with teeth on the underside formed as one piece with the rest of head 1. It is mainly used in self-arrest maneuvers. Adze 5, having a hole therein permits a rope or carabiner to be passed therethrough as well as for weight reduction, is integrated with head 1 and pick 7 and is mainly used for cutting steps into the snow. The central portion of head 1 also has a hole 8 therein permitting a carabiner (not shown) to be clipped thereto for passing a rope therethrough that portion of the tool.

Shank 14 of head 1 is basically rectangular in shape having two apertures 9 accommodating cylindrical projections from the inner walls of upper spacers 10 therein allowing head 1 to be suspended between the two spacers 10 similar to those shown in U.S. Pat. No. 4,432,404 and locked into place on the upper portion of shaft 2 by the two pins 11. Upper spacers 11 are usually made of rubber or plastic such as ultra-high molecular weight polypropylene which is shock absorbing and does not fracture at cold temperatures. It suspends shank 14 from direct contact with shaft 2 walls aiding in shock absorption. Pins 11, made of either steel or aluminum the latter being of second choice because of its malleability, are hollow tubes with seams down the center. When the upper spacers 10 are coupled around shank 14 of ice ax head 1, and positioned inside the upper portion of shaft 2, pins 11 are inserted through apertures 12 in the upper portion of shaft 2 and through the apertures 13 in spacers 10 suspending shank 14 inside shaft 2 thus locking shank 14, head 1 and spacers 10 inside shaft 2. Apertures 13 are located equidistant from the center of each upper spacer 10 and have cylindrical projections from the interior wall of each spacer 10.

Lower spacers 20 are preferably made of the same material as upper spacers 10, that is, rubber or plastic. However, because spacers 20 are attached to spike saw piece 3 and due to the tendency of rubber and plastic to stick to any surface it contacts, yet spike saw piece must be easily removable at the will of the user, it may be desirable to make lower spacers 20 out of a metal such as steel or aluminum. Lower spacers 20 differ from upper spacers 10 in several ways. Instead of having two equal sided apertures 13 the same distance from the center of the spacer like the upper spacers 10 do, the lower spacers 20 have one larger aperture 26 in the center and smaller apertures 24 on either side of the center one. Meanwhile, spike saw piece 3 has two apertures 21 therein between spike 19 and saw 17 accommodating bolt 29 securing shovel blade 4 to shaft 2. Also, in the center of spike 19 is an aperture 25 that permits a rope or carabiner to be passed through that portion of the tool.

These spacers not only house the connection between spike 19 and saw 17 pieces, they also house leaf springs 18 and locking buttons 23 needed to secure spike saw assembly 3 inside the lower portion of shaft 2. Leaf springs 18 are usually made of steel being preferable over aluminum due to its rigidity. They are also generally U-shaped with oblong apertures 22 in their center permitting locking bolt 29 to pass therethrough the lower portion of shaft 2 and shovel blade 4, thereby securing blade 4 to shaft 2. Attached to leaf springs 18 by rivet or weld is locking button 23 securing spike saw piece 3 inside shaft 2.

Tension from leaf springs 18 pushes locking buttons 23 through large aperture 26 in lower spacers 20 and rests secure and flush within upper aperture 15 of the lower portion of shaft 2. The two smaller apertures 24 in lower spacers 20, the oblong apertures 22 in leaf springs 18, and the two apertures 21 between spike 19, saw 17 and lower aperture 16 of the lower portion of shaft 2 are all aligned to allow passage of leashed bolt 29 through all said components and to allow secure attachment of shovel blade 4 to shaft 2. Bolt 29 and wing nut 30 may then secure spike saw piece 3 in either of its positions should spring loaded buttons 23 fail.

The reversible spike-saw portion 3 is held in place by means of dual locking buttons 23 located about 1 inch from the bottom of ice ax shaft 2. Measuring about ¾ inch in diameter, they protrude from opposite sides of shaft 2. They are usually made of chromalloy steel and sit flush with the exterior shaft walls. Buttons 23 are attached to tension tabs 22 that are housed in hard rubber bushing 20 that stabilizes spike-saw 3 piece in ice ax shaft 2, see FIGS. 2–5. To release spike-saw 3, both buttons 23 are pushed in simultaneously while pulling spike-saw 3 out of shaft 2.

Spike portion 19 of 3, when assembled, protrudes from the lower end of shaft 2. It is usually triangular in shape and is made of steel or aluminum. When locked in the exposed position at the lower end of 2, it aids a climber in slope ascension and self-arrest maneuvers. In the invention, saw blade portion 17 of 3 is integrated with 19; however, in another embodiment they may be separate elements. The saw tooth pattern is usually large for general snow use. However, tooth pattern may vary depending on the needs of the operator (cutting limbs off trees, cutting ice, etc.). Spike saw piece 3 also made of iron, steel or aluminum, locks into the lower section of shaft 2 by means of user controlled dual locking buttons 23. The spike 19 end is exposed and the saw 17 portion is hidden inside shaft 2. This is the preferred position for ascension and self-arrest maneuvers as shown in FIG. 7. User must depress both locking buttons 23 simultaneously, remove spike saw piece 3 from its ice ax position as shown in FIG. 5, and insert it back into the lower section of shaft 2 with saw 17 end exposed and spike 19 portion hidden inside 2 as shown in FIG. 8. The saw is then effectively attached to the shaft 2 as an extension. This enables a cut depth far greater than most snow saws and is particularly important for persons attempting a Rutschblock test when they have no alternative such as a ski pole or ski.

The third portion of this multipurpose snow/ice tool for backcountry travel is the shovel blade, FIGS. 1, 6, 9 and 10.

This blade has been modified to fit snugly around the oval shaft of ax handle 2. The shovel 4 is used with the spike-saw 3 piece recessed within ax shaft 2. That is, the spike 19 end is exposed and the saw 17 is hidden within shaft 2. The pipe-like portion 27 of shovel blade 4, having holes 28 therein on opposite sides thereof, is slipped over the lower end of shaft 2 having a hole 16 therethrough while lining-up holes 15 to receive a leashed bolt 29 and wing nut 30 thereby holding the shovel in a fixed position, see FIG. 1. The subject invention eliminates a separate handle and shaft for the shovel by slipping shovel blade 4 only about the bottom of ice ax shaft 2. Thus, ice ax head 1 and shaft 2 serve as a handle and shaft respectively for snow shovel 4. Furthermore, this system employs only one separate portion, the shovel blade 4, as compared with conventional multi-purpose systems which require handling a number of pieces of nuts, bolts and the like to expand the utility of the conventional ice ax, not a desirable situation in a cold, hazardous, unsafe environment.

Shovel sleeve 27, which is generally oval in shape, projects vertically from the top of shovel blade 4 formed to fit snugly around the lower portion of shaft 2. Sleeve 27 having a pair of matching holes 28 through its sides for passing therethrough the front end of threaded leashed bolt 29 having a ring attached to its back end to accommodate leash or tether 33 made of braided metal strands attached to shovel blade 4 thereby securing bolt 29 to shovel blade 4 so it does not get lost. Threaded wing nut 30 prevents bolt 29 from sliding out of holes 16 in shaft 2 and holes 28 in sleeve 27. A suitable replacement for bolt 29 and wing nut 30 would be a threadless pin that has ball bearings projecting out of either side, the head of the pin having a button that when pushed releases the outward pressure on the bearings allowing them to recede into the walls of the pin, thus permitting the pin to be removed from the holes that allow the pin to secure blade 4 to shaft 2. Ribs 31 of an inverted U-shape run down the center of the back of blade 4 and can be lengthened or shortened to suit the needs of the user. Blade 4 may have apertures 32 on its side to permit rope to be passed therethrough for securing blade 4 to a backpack.

Many variations of the invented tool are possible including interchangeable heads on the ice ax, shovel blades of metal or plastic, and saw blades with many tooth pattern variations as well as having removable saw blades themselves. Of course, there are variations in ice ax length as well as alternatives to the locking device means for both shovel and spike saw portions. The concept of combining these three essential tools into one solves the frequent problem of leaving gear behind when venturing into a mountainous winter environment. It also reduces the never ending struggle to reduce the weight of the load the "climber" must carry. The word "climber" as it is used here incorporates all persons traveling in the winter backcountry or other unpopulated mountain areas where one must rely on oneself for snow and mountain safety. Having a snow saw with the extension of the subject invention is especially important when performing a Rutschblock test for cutting deeper into the snow pack with ease. Without ski poles, this saw extension appears to be the only alternative to enable a Rutschblock test.

As disclosed above, the instant invention provides the winter backcountry traveler with versatility in mountaineering tools. Due to its compact size, it is an easy weight to carry when it can help to save your life. It embodies the essential tools of backcountry travel all in one.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multipurpose ice ax for backcountry travel comprising:
    a head having a toothed pick at its first end and an adze at its second end with a shank therebetween;
    a hollow shaft having holes therein its upper end to internally receive said shank having matching holes therein and locked in place with pins, said shaft having holes therein its lower end for internally receiving a combined reversible spike saw having matching holes therein said spike saw comprising a spike and a saw;
    shock absorbing upper spacers having holes therein for connecting said shank of the head within said upper end of said shaft for reducing the shock of said shank against said shaft when the force of the head impacts snow and ice;
    lower spacers having holes therein for connecting and rigidly fixing said spike saw within said lower end of said shaft selected from the group consisting of rubber, plastic, steel and aluminum;
    means for reversing said spike saw to expose said spike or said saw as necessary; and
    a shovel blade having a blade portion and a sleeve like portion having holes therein carried separately from the integrated multipurpose ice ax and attachable to said lower end of said shaft by means of a shovel fastener inserted through matching holes of said shaft and said sleeve like portion while said spike saw is housed within said shaft with said spike exposed.

2. The ice ax in accordance with claim 1 wherein the head is selected from the group consisting of iron, steel, aluminum, and chromalloy steel.

3. The ice ax in accordance with claim 1 wherein the head and said adze thereof have holes therein for reduction of weight.

4. The ice ax in accordance with claim 1 wherein said shaft is typically of steel or aluminum.

5. The ice ax in accordance with claim 1 wherein the means for reversing said spike saw to expose said saw for cutting snow and ice is a pair of locking buttons attached to leaf springs placed against the underside of said lower spacers said buttons being depressible simultaneously for removal and reversal of said spike saw.

6. The ice ax in accordance with claim 1 wherein said shovel blade is selected from the group consisting of iron, steel, aluminum, polypropylene and graphite impregnated plastic.

7. The ice ax in accordance with claim 1 wherein said shovel fastener is a bolt leashed to said shovel blade to avoid loss, inserted through said sleeve like portion of said shovel blade and said shaft and locked into place with a wing nut.

\* \* \* \* \*